March 30, 1943.   G. W. ASHLOCK, JR   2,314,862
FRUIT PITTING CHUCK
Filed Feb. 4, 1942
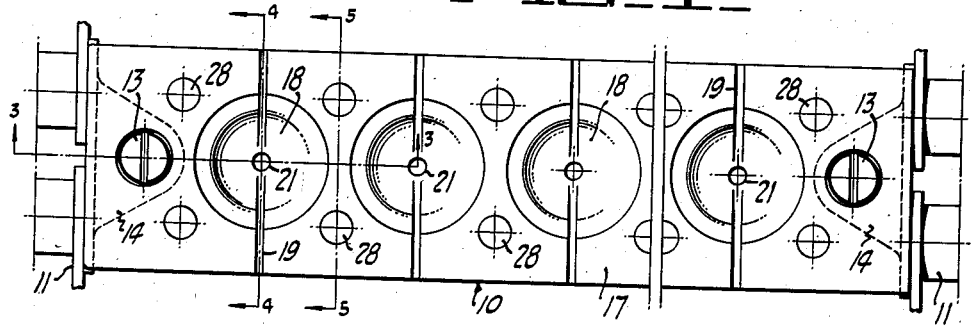
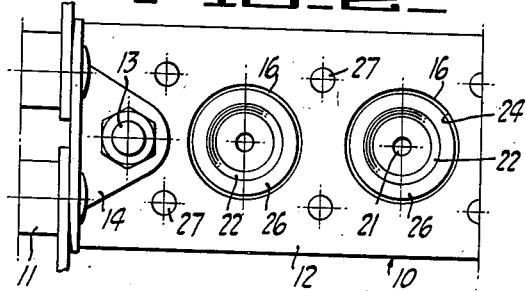
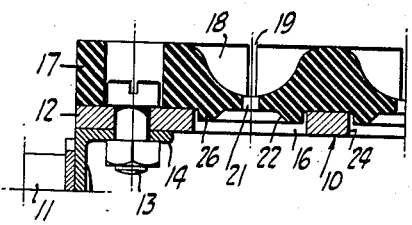
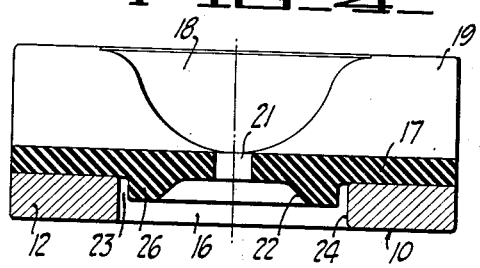
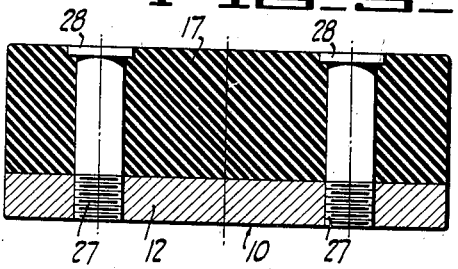
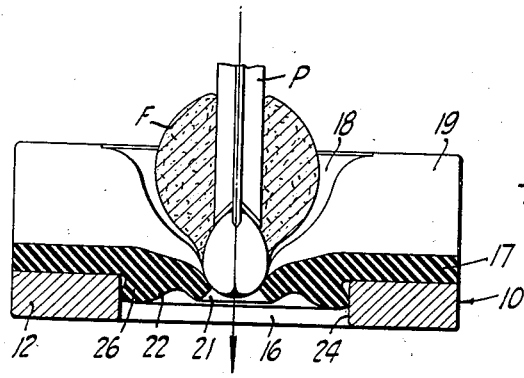
INVENTOR
George W. Ashlock Jr
BY Robert N. Eckhoff
ATTORNEY Patented Mar. 30, 1943

2,314,862

UNITED STATES PATENT OFFICE 2,314,862

FRUIT PITTING CHUCK

George W. Ashlock, Jr., Oakland, Calif.

Application February 4, 1942, Serial No. 429,489

4 Claims. (Cl. 146—19)

This invention relates to an improved fruit pitting chuck of the type disclosed in my Patent 2,209,305 of July 30, 1940.

In my Patent 2,157,518 of May 9, 1939, and 2,219,832 of October 29, 1940, I have disclosed machines for rapidly stoning or pitting fruit such as cherries and the like. Briefly, these machines include a conveyor which is advanced over a path, the conveyor being made up of a suitable series of receptacles for the fruit. These are usually termed "chucks" by those skilled in the art. As the conveyor traverses its path, plunger-like knives are lowered to engage the fruit, cut and eject the stone or pit therein, usually through the bottom of the chuck.

In my aforementioned Patent 2,209,305 I disclosed a suitable form of chuck to be employed for supporting the fruit during its transportation and during the pit or stone removal operation. This chuck includes a metal base plate having a series of apertures therein with a rubber facing sheet usually integrally bonded to the base plate and formed with a plurality of receptacles therein in vertical alignment with the apertures in the base plate. Thus the chuck provided a series of receptacles extending across each plate in which the fruit was positioned.

While such a structure has proven successful and was well received in the art, I have found that certain desirable modifications can be made in the structure to adapt it to severe usage. For example, in the series of receptacles provided across the plate, it sometimes happens that one will not be filled. Consequently, during the stoning operation the unfilled receptacle permits unequal working stresses to be set up when fruit on either side thereof is stoned. Consequently, one or both of the fruit undergoing stoning on each side of the unfilled receptacle may slip out of alignment with the result that the pitting knife or plunger will skid off the stone or pit and the fruit will not be pitted, or not pitted satisfactorily. In accordance with this invention, each receptacle is so constructed that it is held in vertical alignment and is substantially free of working forces applied by a stoning operation in an adjacent receptacle.

In my patents 2,212,892 and 2,212,893 of August 27, 1940, I have disclosed a fruit orienting device in which a plurality of rod-like members are moved relative to the fruit receiving receptacles to turn and finally orient fruit supported in the receptacles. It is desirable, for efficient functioning of this fruit orienting means, that the slot in which each rod-like member operates be in accurate alignment with the slots in other receptacles or chucks on the fruit conveyor. This is successfully achieved in the structure of the present invention.

It is in general the broad object of the present invention to provide an improved rubber pitting chuck for the stoning of cherries and the like.

A further object of the present invention is to provide a rubber fruit pitting or stoning chuck which is rugged in construction, simple and economical of manufacture, and which can be readily replaced if it should fail or become damaged in use.

The invention includes other objects and features of advantage, some of which, together with the foregoing, will appear hereinafter wherein the present preferred form of the fruit pitting chuck of this invention is disclosed. It will be understood that the form of the mechanism disclosed is only that presently preferred and that within the scope of the appended claims various other embodiments may be adopted by those skilled in the art.

In the drawing accompanying and forming a part hereof,

Figure 1 is a top plan view of the fruit pitting chuck of the present invention.

Figure 2 is a partial bottom plan view.

Figure 3 is a cross section taken along the line 3—3 of Figure 1.

Figure 4 is a cross section taken along the line 4—4 of Figure 1.

Figure 5 is a cross section taken along the line 5—5 of Figure 1.

Figure 6 is a view similar to Figure 4 but showing the operation during stoning of a cherry or the like.

The fruit pitting chuck of the present invention comprises a structure generally indicated at 10 and adapted to be mounted between opposite conveyor chains 11 in the manner disclosed by my aforementioned patents. These chains are movable to convey fruit F to the fruit pitting mechanism P as disclosed in my aforementioned patents.

Each chuck is made up of a flat metal base plate of relatively rigid material, usually brass, this plate being indicated at 12. Bolts 13 are employed to secure each plate by means of bracket 14 to the conveyor chains 11.

The plate 12 includes a plurality of apertures indicated at 16. These are usually circular in cross section but their form can be varied so long as it does not interfere with the functioning of the cherry stoning mechanism or stone ejection. For example, the apertures can be made square instead of circular.

To provide for actual reception of the fruit to be carried I provide a rubber facing sheet 17. Instead of rubber this can be made of any other suitable resilient material equivalent to rubber in its functioning, such as "duprene," "neoprene," "thiokol," or the like. The resilient facing sheet 17 is preferably flat on its upper face so that when a plurality of carrier structures 10 are assembled together they form a flat continuous work surface with the rubber facing sheet uppermost.

Each plate includes a series of suitable fruit receiving receptacles 18 therein, usually in the form of a cup so that the receptacles or chucks can be termed "cup-like." Each receptacle is cut or slotted as at 19 to permit functioning of my previously mentioned orienting mechanism wherein rod-like members are extended through the slots. In addition, the slots permit the use of knives or the like to sever the fruit subsequent to the stoning operation.

Apertures 21 are provided adjacent the bottom of each receptacle to permit the fruit pit ejected to pass away from the fruit. In accordance with this invention, the bottom of each receptacle is formed with a depending portion 26 connected by a sloping face portion 22 to the central portion of the chuck. In plan this depending portion approximates the outline of the aperture in the base plate but is spaced slightly therefrom as appears at 23 of Figure 4. This spacing is an advantage, for, as it appears in Figure 6, when a fruit F is being pitted by pitting mechanism P and a downward force is placed upon the bottom of the receptacle, the depending portion moves in and engages the sidewall 24 of the aperture 16 in the base plate and provides support for the bottom portion of the receptacle. This support is enhanced by depending portion 26 on the outer bottom periphery of the chuck as well as the enlarged cross section provided by sloping face 22.

In accordance with this invention, each facing strip 17 is positioned detachably on the base plate by a plurality of pins indicated at 27. These extend upwardly from the face of the base plate and pass through suitable apertures in the facing strip 17. Usually the ends of the pins are enlarged as at 28 to retain the facing strip in position. Preferably the pins are positioned on opposite sides of each aperture. A single pin on each side of each aperture will suffice but I prefer to employ a plurality of pins on each side of the aperture.

In operation, a fruit being pitted in but one chuck, the working stresses placed upon the rubber facing sheet 17 are transmitted to the pins on each side thereof and thus isolated from the adjacent portions of the facing sheet defining adjacent receptacles. Deformation of the facing sheet does not occur even though only alternate apertures across the sheet are filled with fruit. In addition, the pins cause the strip to retain its shape even though the strip is subject to continuous use involving the pitting of hundreds of thousands of fruit in each receptacle. Further, when a facing sheet becomes worn or damaged it can be readily replaced by stripping it from the pins and inserting a new one.

I claim:

1. In a fruit stoning device of the character described, a fruit holder comprising a flat rigid base plate having a plurality of spaced apertures therein of generally circular cross-section, a plurality of pins extending up from a face of said base plate and disposed on opposite sides of each aperture, and a rubber sheet apertured to receive and pass said pins which serve to position and to retain said sheet in position on said base plate, said sheet including a fruit receiving receptacle substantially in vertical alignment over each base plate aperture, each receptacle being apertured adjacent the bottom thereof to pass a fruit stone ejected from a fruit in said receptacle.

2. In a fruit stoning device of the character described, a fruit holder comprising a flat rigid base plate having a plurality of spaced apertures therein of generally circular cross-section, a plurality of pins extending up from a face of said base plate and disposed on opposite sides of each aperture, and a rubber sheet apertured to receive and pass said pins which serve to position and to retain said sheet in position on said base plate, said sheet including a fruit receiving receptacle substantially in vertical alignment over each base plate aperture, each receptacle including a generally circular portion depending into each base plate aperture and cooperating therewith to provide support for the bottom of said receptacle which is apertured to pass a fruit stone ejected from a fruit in said receptacle.

3. In a fruit stoning device of the character described, a fruit holder comprising a flat rigid base plate having a plurality of spaced apertures therein, a plurality of pins extending up from a face of said base plate and disposed on opposite sides of each aperture, and a rubber sheet apertured to receive and pass said pins which serve to position and to retain said sheet in position on said base plate, said sheet including a fruit receiving receptacle substantially in vertical alignment over each base plate aperture, each receptacle including a portion depending into each base plate aperture and of the same general cross-section as said base plate aperture with which it cooperates to provide support for the bottom of said receptacle which is apertured to pass a fruit stone ejected from a fruit in said receptacle.

4. A fruit holder as in claim 3 wherein the pins are arranged in pairs on opposite sides of each fruit receptacle.

GEORGE W. ASHLOCK, Jr.